(12) United States Patent
Khatuntsev

(10) Patent No.: US 11,549,800 B2
(45) Date of Patent: Jan. 10, 2023

(54) SELF-LEVELING SYSTEM FOR ROTATING LASER SYSTEMS

(71) Applicant: Topcon Positioning Systems, Inc., Livermore, CA (US)

(72) Inventor: Nikolay V. Khatuntsev, Pleasanton, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 506 days.

(21) Appl. No.: 16/821,855

(22) Filed: Mar. 17, 2020

(65) Prior Publication Data
US 2021/0293527 A1 Sep. 23, 2021

(51) Int. Cl.
| G01C 15/00 | (2006.01) |
|---|---|
| G01B 11/00 | (2006.01) |
| G01S 17/08 | (2006.01) |

(52) U.S. Cl.
CPC .......... *G01B 11/002* (2013.01); *G01C 15/004* (2013.01); *G01C 15/006* (2013.01); *G01S 17/08* (2013.01)

(58) Field of Classification Search
CPC ..... G01B 11/02; G01C 15/004; G01C 15/006
USPC .................................................... 33/290, 291
See application file for complete search history.

(56) References Cited

U.S. PATENT DOCUMENTS

| 7,370,427 | B2 | 5/2008 | Ammann et al. | |
|---|---|---|---|---|
| 8,407,903 | B2 * | 4/2013 | Koleszar | G01C 15/004 33/285 |
| 8,699,005 | B2 * | 4/2014 | Likholyot | G01S 17/42 356/3.01 |
| 8,959,783 | B2 * | 2/2015 | Kumagai | G01C 15/002 33/291 |
| 9,151,830 | B2 * | 10/2015 | Bridges | G01C 15/002 |
| 9,400,170 | B2 * | 7/2016 | Steffey | G01B 11/002 |
| 9,407,364 | B2 * | 8/2016 | Dumoulin | G01C 15/008 |
| 10,145,671 | B2 | 12/2018 | Khatuntsev | |
| 10,809,379 | B2 * | 10/2020 | Nishita | G01C 11/02 |
| 2003/0136901 | A1 * | 7/2003 | Ohtomo | G01C 15/004 250/234 |
| 2013/0152412 | A1 | 6/2013 | Kumagai et al. | |
| 2018/0356220 | A1 | 12/2018 | Lukic | |
| 2020/0256998 | A1 * | 8/2020 | Mccain | G01C 21/165 |
| 2021/0123735 | A1 * | 4/2021 | Komposch | G01C 25/00 |

(Continued)

FOREIGN PATENT DOCUMENTS

| CN | 208012530 U | 10/2018 |
|---|---|---|
| EP | 2522954 A1 | 11/2012 |

OTHER PUBLICATIONS

International Search Report and Written Opinion dated Apr. 13, 2021, in connection with International Patent Application No. PCT/US2021/015149, filed Jan. 27, 2021, 15 pgs.

*Primary Examiner* — George B Bennett
(74) *Attorney, Agent, or Firm* — Chiesa Shahinian & Giantomasi PC

(57) ABSTRACT

A self-leveling laser transmitter is provided. The laser transmitter comprises a rotation head and an accelerometer mounted on the rotation head. An acceleration signal is received from the accelerometer and one or more tilt adjustment signals for adjusting a tilt of the rotation head to a leveled orientation are generated based on the acceleration signal. One or more actuators adjust the tilt of the rotation head based on the one or more tilt adjustment signals.

20 Claims, 11 Drawing Sheets

(56) References Cited

U.S. PATENT DOCUMENTS

| | | | |
|---|---|---|---|
| 2021/0124026 A1* | 4/2021 | Khatuntsev | G01S 7/003 |
| 2022/0170743 A1* | 6/2022 | Gould | G01C 15/004 |
| 2022/0252396 A1* | 8/2022 | Kikuchi | G01S 17/89 |

* cited by examiner

Receive an acceleration signal from an accelerometer mounted on a rotation head of a laser transmitter
502

↓

Generate one or more tilt adjustment signals for adjusting a tilt of the rotation head to a leveled orientation based on the acceleration signal
504

↓

Adjust the tilt of the rotation head based on the one or more tilt adjustment signals
506

SELF-LEVELING SYSTEM FOR ROTATING LASER SYSTEMS

TECHNICAL FIELD

The present invention relates generally to rotating laser systems, and more particularly to a self-leveling laser transmitter for rotating laser systems.

BACKGROUND

Preparation of worksites, such as, e.g., construction and agricultural worksites, typically involves grading and excavating portions of the worksite into desired topologies. Positional measuring is an important aspect in worksite preparation in order to improve the accuracy of such grading and excavating. Laser measuring systems are commonly used by construction machines (e.g., dozers, scrapers, excavators, etc.) to facilitate positional measuring. Specifically, a laser transmitter of a laser measuring system will transmit a laser signal and a laser receiver of the laser measuring system will receive the laser signal to determine positional measurements of the laser receiver. However, in order to provide accurate measurement results, the laser transmitter must be leveled.

Conventionally, laser measuring systems are self-leveled by measuring tilt angles using two non-rotating inclinometers either of vial type or MEMS (microelectromechanical systems) type and adjusting the tilt using one or more motors. One disadvantage of such conventional laser measuring systems is that the assembly of the inclinometers must be calibrated so that the zero angles of the inclinometers exactly correspond to the vertical axis of rotation. Such calibration is typically performed during manufacturing by applying additional calibration steps to align the inclinometers to the rotational axis. Such conventional laser measuring systems are also prone to losing calibration due to, e.g., the laser transmitter being dropped.

BRIEF SUMMARY OF THE INVENTION

In accordance with one or more embodiments, a self-leveling laser transmitter is provided. The self-leveling laser transmitter achieves a high degree of accuracy without the use of expensive inclinometers.

In one embodiment, a laser transmitter comprises a rotation head and an accelerometer mounted on the rotation head. An acceleration signal is received from the accelerometer and one or more tilt adjustment signals for adjusting a tilt of the rotation head to a leveled orientation are generated based on the acceleration signal. One or more actuators adjust the tilt of the rotation head based on the one or more tilt adjustment signals.

In one embodiment, the acceleration signal represents at least one of acceleration on a tangential axis of the accelerometer and acceleration on a radius axis of the accelerometer as the accelerometer rotates. The one or more tilt adjustment signals are determined to substantially eliminate a sinusoidal component from the acceleration signal. In one embodiment, the one or more tilt adjustment signals are determined based on an angle of misalignment between a reference angle of an encoder of the laser transmitter and a reference angle of the one or more actuators. In another embodiment, the one or more tilt adjustment signals are determined to minimize an amplitude of the acceleration signal.

In one embodiment, a first tilt adjustment signal for adjusting a tilt of the rotation head in a first dimension and a second tilt adjustment signal for adjusting a tilt of the rotation head in a second dimension are determined. A first actuator adjusts the tilt of the rotation head in the first dimension based on the first tilt adjustment signal and a second actuator adjusts the tilt of the rotation head in the second dimension based on the second tilt adjustment signal.

In accordance with one or more embodiments, a self-leveling apparatus is provided, such as, e.g., a laser transmitter. The self-leveling apparatus comprises a rotation head and an accelerometer mounted on the rotation head. An acceleration signal is received from the accelerometer and one or more tilt adjustment signals for adjusting a tilt of the rotation head to a leveled orientation are generated based on the acceleration signal. One or more actuators adjust the tilt of the rotation head based on the one or more tilt adjustment signals.

These and other advantages of the invention will be apparent to those of ordinary skill in the art by reference to the following detailed description and the accompanying drawings.

BRIEF DESCRIPTION OF THE DRAWINGS

FIG. 5 shows a method for leveling a rotation head of a laser transmitter;

DETAILED DESCRIPTION

Figure 1:
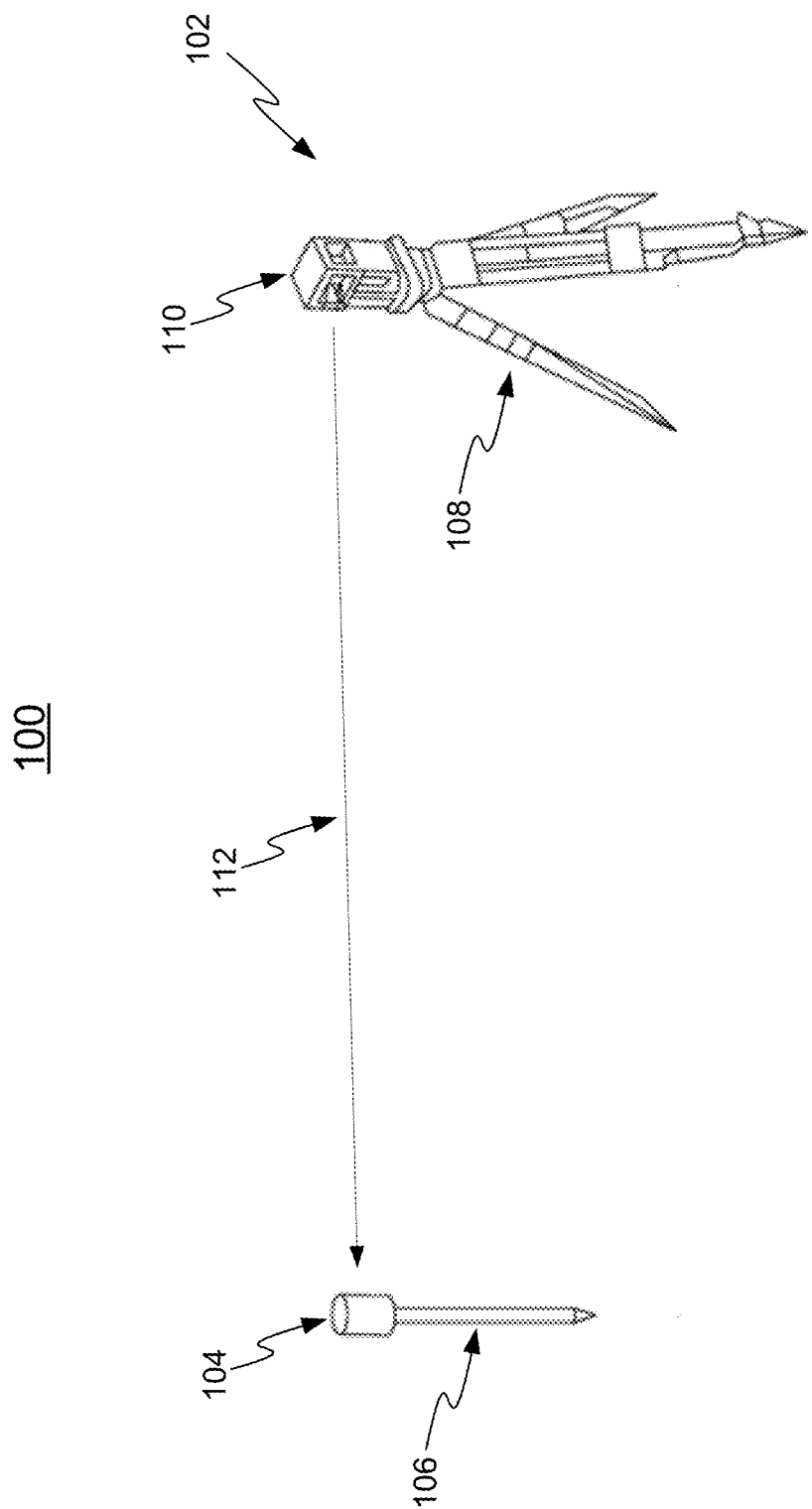
FIG. 1 shows a high-level overview of a laser measuring system.

FIG. 1 shows a laser measuring system 100, in accordance with one or more embodiments. Laser measuring system 100 includes a laser transmitter 102 and a laser receiver 104. As illustratively shown in FIG. 1, laser receiver 104 is configured to be attached to a surveying pole 106. However, it should be understood that various configurations of laser receiver 104 are possible. For example, laser receiver 104 may be configured to be attached to a construction machine (e.g., excavator, dump truck, bull dozer, etc.) or may be a hand held device. It should be understood that laser measuring system 100 may include any number of laser receivers for calculating position and orientation information for each laser receiver 104 based on laser beams received from laser transmitter 102.

Laser Transmitter 102 comprises a rotation head 110 mounted on a tripod 108 or any other base (e.g., surveying pole, construction machine, etc.) on which rotation head 110 rotates. Laser transmitter 102 projects laser signal 112 in rotary irradiation at a constant speed to laser receiver 104. In one embodiment, laser signal 112 is an N-shaped beam, as described in U.S. Pat. No. 7,196,302, issued Mar. 27, 2007, the disclosure of which is incorporated herein by reference in its entirety. However, laser beam 112 may be any suitable laser beam (e.g., an I-shaped beam). In one embodiment, laser transmitter 102 is laser transmitter 200 shown in FIG. 2, described in detail below.

Positional measurements of laser receiver 104 are determined based on laser signals transmitted by laser transmitter 102 and received by laser receiver 104. However, in order for laser measuring system 100 to provide accurate positional measurements of laser receiver 104, rotation head 110 of laser transmitter 102 must be leveled. Rotation head 110 is leveled when the rotation axis of rotation head 110 is substantially parallel to the vector of gravity. In accordance with embodiments of the present invention, rotation head 110 of laser transmitter 102 is configured with an accelerometer and rotation head 110 is leveled by determining tilt adjustment signals based on an acceleration measured by the accelerometer and adjusting the tilt of rotation head 110 to a leveled orientation based on the one or more tilt adjustment signals.

Embodiments of the present invention may be applied for leveling a laser transmitter, such as, e.g., a 3D laser transmitter as described in U.S. Pat. No. 10,145,671, issued Dec. 4, 2018, the disclosure of which is incorporated herein by reference in its entirety, or an N-beam laser transmitter. However, it should be understood that embodiments of the present invention may be applied for leveling rotational systems of any type, such as, e.g., for leveling a reference plane of a laser system or for a high-accuracy plumb tool for construction.

Figure 2:
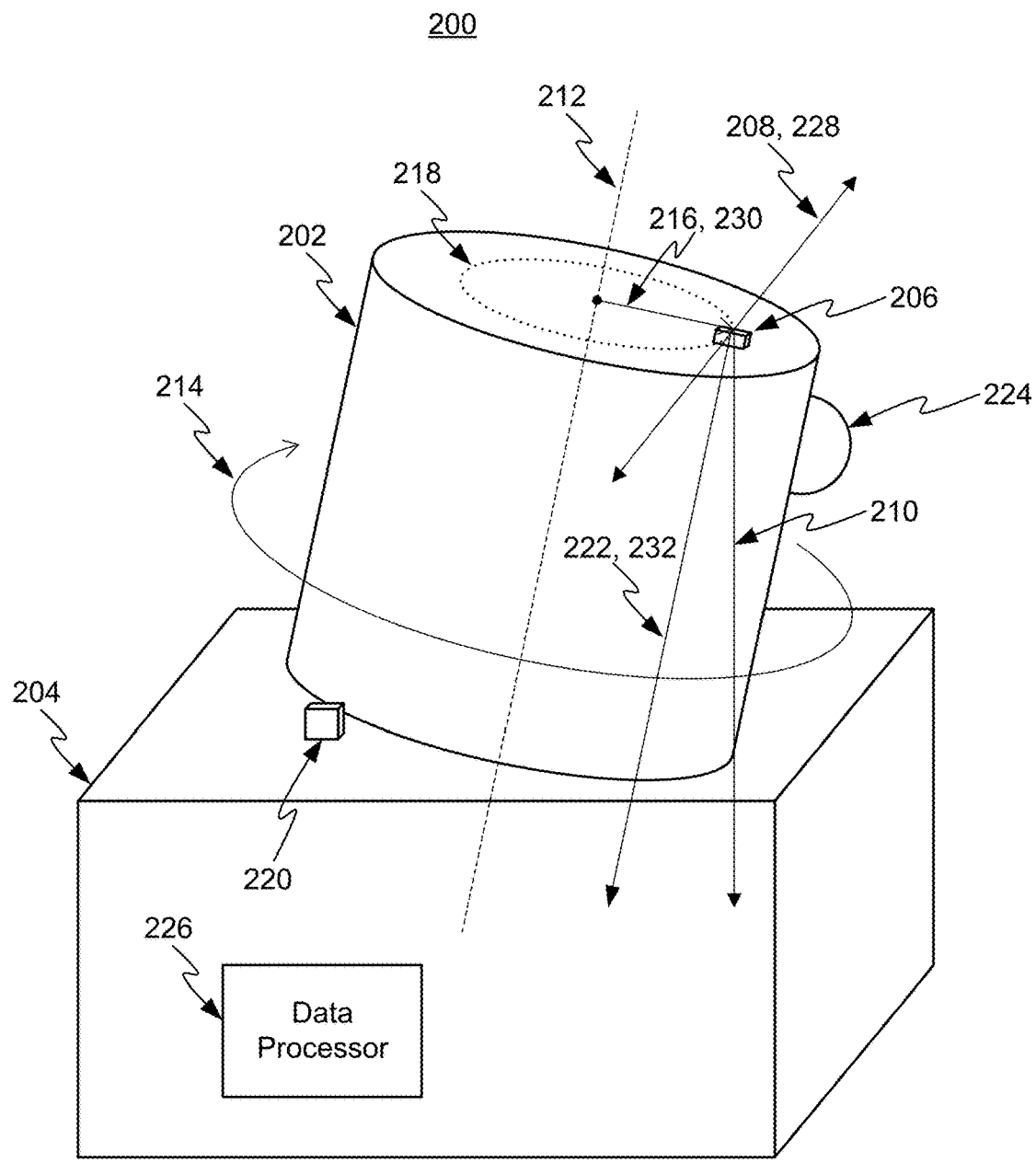
FIG. 2 shows a detailed view of a laser transmitter.
Figure 2:
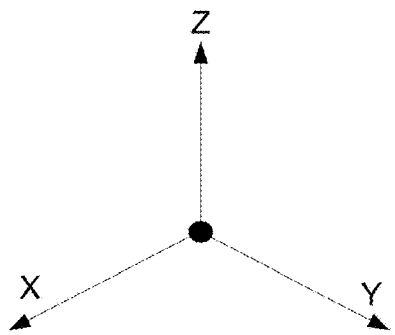

FIG. 2 shows a detailed view of a laser transmitter 200, in accordance with one or more embodiments. In one embodiment, laser transmitter 200 is laser transmitter 102 of FIG. 1. Laser transmitter 200 comprises a rotation head 202 mounted on a base 204 attached to, e.g., tripod, surveying pole, construction machine, etc. Rotation head 202 rotates about rotation axis 212 in a clockwise direction 214 (or a counter-clockwise direction in some embodiments). As rotation head 202 rotates, one or more laser diodes (not shown), or other laser sources, project laser signals through transmitter lens 224.

Rotation head 202 includes an accelerometer 206 to facilitate leveling of rotation head 202. Accelerometer 206 may be any suitable accelerometer having at least one sensing axis and having a suitable minimum sampling frequency and noise density. Leveling accuracy of rotation head 202 can be estimated according to Equation (1) as follows:

$$L_{acc} = \frac{N_d}{\sqrt{\text{leveling\_duration}}} \quad (1)$$

where $L_{acc}$ is the leveling accuracy in mkrad, $N_d$ is the noise density of accelerometer 206 in mkg $\sqrt{Hz}$, and leveling duration is the duration of leveling in seconds. The minimum sampling frequency is preferably at least twice bigger than the output bandwidth of accelerometer 206. The output bandwidth of accelerometer 206 is preferably bigger than the rotation rate of rotation head 202. In an advantageous embodiment, the output bandwidth of accelerometer 206 is at least twice bigger that the rotation rate of rotation head 202. Accelerometer 206 may be positioned at any location on or in rotation head 202. In an advantageous embodiment, accelerometer 206 is placed as close as possible to rotation axis 212.

In one embodiment, accelerometer 206 is a single axis accelerometer having sensing axis 228 oriented to measure tangential acceleration of accelerometer 206 as accelerometer 206 rotates (via rotation head 202, e.g., during rotary irradiation) about rotation axis 212. As illustratively shown in FIG. 2, accelerometer 206 rotates (via rotation head 202) about rotation axis 212 along a circular path 218. Accelerometer 206 is oriented such that its sensing axis 228 is aligned with a tangential axis 208 of circular path 218 of accelerometer 206. Tangential axis 208 of accelerometer 206 is perpendicular to rotation axis 212 and perpendicular to a radial axis 216 of accelerometer 206. Radial axis 216 is the axis formed between rotation axis 212 and accelerometer 206 and corresponds to the radius of circular path 218 at the location of accelerometer 206. Axes 208, 212, and 216 are perpendicular to each other and form an orthogonal 3D system.

In one embodiment, accelerometer 206 is a three axis accelerometer having a first sensing axis 230 oriented to measure radial acceleration of accelerometer 206, a second sensing axis 228 oriented to measure tangential acceleration of accelerometer 206, and a third sensing axis 232 oriented to measure a gravitational acceleration of accelerometer 206. Accordingly, accelerometer 206 is oriented such that the first sensing axis 230 is aligned with radial axis 216, the second sensing axis 228 is aligned with tangential axis 208, and the third sensing axis 232 is aligned with a gravitational axis 222 parallel to rotation axis 212. An exemplary output of acceleration signals from a three axis accelerometer is illustratively shown in graph 300 of FIG. 3, described in more detail below.

It should be understood that accelerometer 206 may be any suitable accelerometer having at least one sensing axis that is not parallel to rotation axis 212. If the at least one sensing axis of accelerometer 206 is parallel to rotation axis 212, the at least one accelerometer will sense only the DC (direct current) component and no AC (alternating current) component and, thus, cannot be used for self-leveling. In one example, accelerometer 206 may be an inertial measurement unit.

Accelerometer 206 generates acceleration signals representing acceleration on tangential axis 208 (and, in some embodiments, radial acceleration signals and/or gravitational acceleration signals) and transmits the acceleration signals to a data processor 226 using any suitable data transmission mechanism. Data processor 226 may be implemented using any computing device, such as, e.g., computer 1102 of FIG. 11, and may be integrated within base 204 as shown in FIG. 2 or may be integrated within rotation head 202. The data transmission mechanism may transmit acceleration signals between accelerometer 206 and data processor 226, e.g., where data processor 226 is integrated in base 204. The data transmission mechanism may also transmits actuator control signals between one or more actuators 220 and data processor 226, e.g., where data processor 226 is integrated in rotation head 202. The data transmission mechanism may be based on a wired connection implemented using, e.g., a slip ring. Additionally or alternatively, the data transmission mechanism may be based on a wireless connection implemented using, e.g., radio frequency (RF) transmission or optical transmission using separate simplex channels in both directions. Other data transmission mechanisms may also be employed.

Data processor 226 receives the acceleration signals from accelerometer 206, generates tilt adjustment signals for adjusting a tilt of rotation head 202 to a leveled orientation, and outputs the tilt adjustment signals to (e.g., two) actuators 220 for adjusting the tilt of rotation head 202 based on the tilt adjustment signals. Data processor 226 determines the tilt adjustment signals to remove any sinusoidal component from the acceleration signals to thereby level rotation head 202. When rotation head 202 is level, rotation axis 212 is parallel to gravitational vector 210. In one embodiment, data processor 226 determines the tilt adjustment signals for leveling rotation head 202 according to method 500 of FIG. 5. Actuators 220 are coupled between rotation head 202 and base 204 to adjust the tilt of rotation head 202 in two dimensions. In one embodiment, actuators 220 include first and second actuators for adjusting the tilt of rotation head 202 in an X dimension and a Y dimension, respectively. Actuators 220 may include one or more stepper motors with lead screws or any other suitable actuators.

Accelerometer 206 may be powered via any suitable power transmission mechanism (not shown in FIG. 2). The power transmission mechanism may be based on a wired connection implemented using, e.g., a slip ring. Additionally or alternatively, the power transmission mechanism may be based on a wireless connection implemented using, e.g., RF power transmission with antennas on the rotation head 202 and base 204 or optical power transmission with light emitting diodes (LEDs) mounted on base 204 and photo diodes or solar cells mounted on rotation head 202 to collect light from the LEDs and convert the light into electricity. Other power transmission mechanisms may also be employed.

Figure 3:
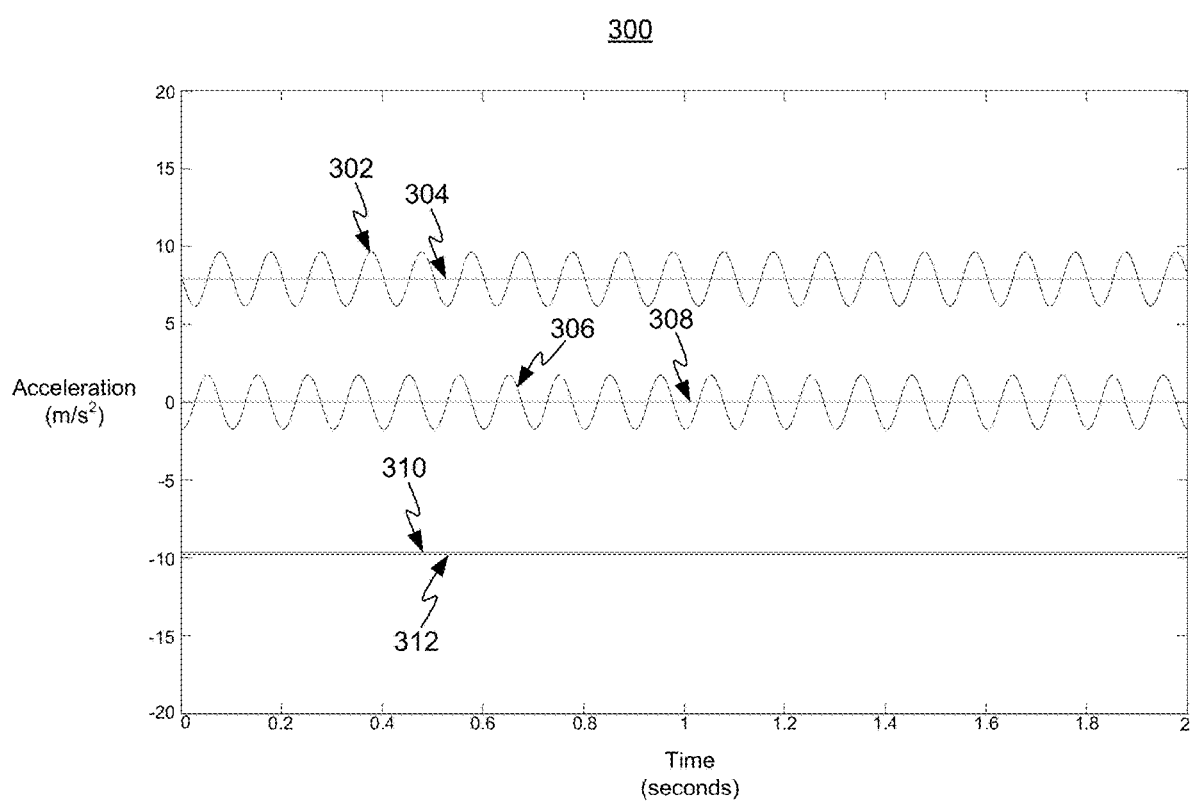
FIG. 3 shows an exemplary graph of acceleration signals output by a three axis accelerometer.

FIG. 3 shows an exemplary graph 300 of acceleration signals generated and output by a three axis accelerometer, in accordance with one or more embodiments. The acceleration signals in graph 300 represent acceleration (in m/s$^2$) over time (in seconds). FIG. 3 will be described with reference to FIG. 2. In one embodiment, the acceleration signals in graph 300 may be output by accelerometer 206 of FIG. 2 mounted on rotation head 202 of a laser transmitter 200. Accelerometer 206 is oriented such that its first sensing axis 230 is aligned with radial axis 216, its second sensing axis 228 is aligned with a tangential axis 208, and its third sensing axis 232 is aligned with gravitational axis 222 (parallel to rotation axis 212). Some misalignment of the sensing axes is acceptable as long as clipping does not occur. An example of clipping is illustratively shown in FIG. 4, described below.

Radial acceleration signal 302 represents radial acceleration measured along the radial axis 216 by the first sensing axis 230 when rotation head 202 is not level and radial acceleration signal 304 represents radial acceleration measured along the radial axis 216 by the first sensing axis 230 when rotation head 202 is level. Tangential acceleration signal 306 represents tangential acceleration measured along the tangential axis 208 by the second sensing axis 228 when rotation head 202 is not level and tangential acceleration signal 308 represents tangential acceleration measured along the tangential axis 208 by the second sensing axis 228 when rotation head 202 is level. Gravitational acceleration signal 310 represents gravitational acceleration measured along the gravitational axis 222 by the third sensing axis 232 when rotation head 202 is not level and gravitational acceleration signal 312 represents gravitational acceleration measured along the gravitational axis 222 by the third sensing axis 232 when rotation head 202 is level.

As shown in graph 300, radial acceleration signals 302 and 304 are subject to a bias of $a=4\pi^2 f^2 r$, where f is the frequency of rotation in Hertz and r is the accelerometer offset radius in meters. Tangential acceleration signals 306 and 308 are not subject to a bias. Acceleration signals 302 and 306 are sinusoidal due to the non-level orientation of rotation head 202. Gravitational acceleration signals 310 and 312 represent acceleration due to gravity and are not sensitive to the level or non-level orientation of rotation head 202.

When rotation head 202 is level, accelerometer 206 will output a radial acceleration of the bias of $a=4\pi^2 f^2 r$, a tangential acceleration of zero, and a gravitational acceleration approximately equal to the acceleration of gravity. In practice, acceleration signals from accelerometer 206 may have noise and drift offset.

Figure 4:
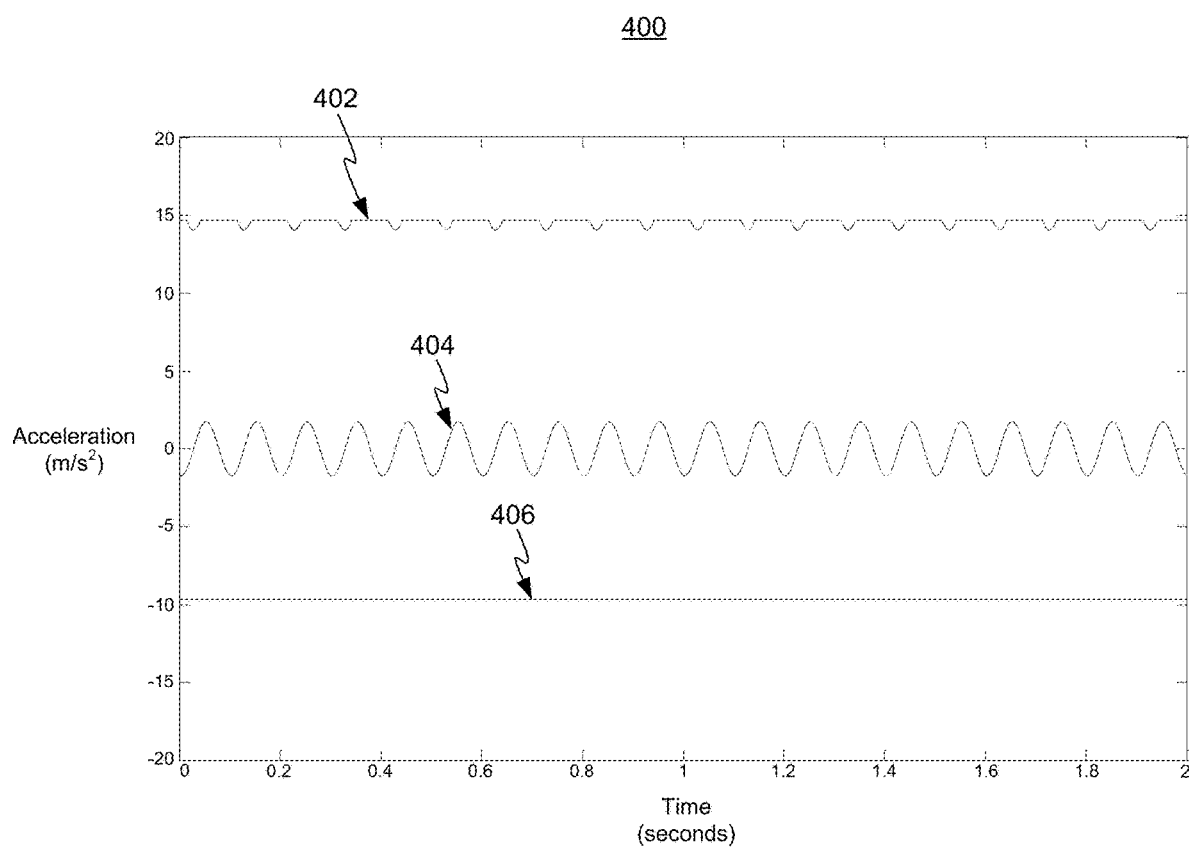
FIG. 4 shows an exemplary graph of a clipping effect of an acceleration signal.

FIG. 4 shows an exemplary graph 400 of a clipping effect of an acceleration signal output by a three axis accelerometer, in accordance with one or more embodiments. The acceleration signals in graph 400 represent acceleration (in m/s$^2$) over time (in seconds). FIG. 4 will be described with reference to FIG. 2. In one embodiment, the acceleration signals in graph 400 may be output by accelerometer 206 of FIG. 2 mounted and oriented as described above with respect to FIG. 3.

Radial acceleration signal 402 represents radial acceleration measured along radial axis 216, tangential acceleration signal 404 represents tangential acceleration measured along tangential axis 208, and gravitational acceleration signal 406 represents gravitational acceleration measured along gravitational axis 222. As illustratively shown in FIG. 4, radial acceleration signal 402 experiences clipping due to the output range of accelerometer 206 being too small for a given radial offset and for a given rotation rate, so the bias of $a=4\pi^2 f^2 r$ offsets the signal to the edge of output range. The clipping results in a flat cutoff at, e.g., 1.5 times gravitational acceleration in radial acceleration signal 402 due to data range constraints of accelerometer 206. Some misalignment of the sensing axes is acceptable as long as clipping does not occur, particularly in tangential acceleration signal 404.

FIG. 5 shows a method 500 for leveling a rotation head of a laser transmitter, in accordance with one or more embodiments. Method 500 will be described with reference to FIG. 2. In one embodiment, method 500 is performed by data processor 226.

At step 502, an acceleration signal is received from an accelerometer 206 mounted on a rotation head 202 of a laser transmitter 200. In one embodiment, the acceleration signal represents an acceleration on accelerometer 206 measured by a sensing axis 228 of accelerometer 206 aligned with tangential axis 208 as accelerometer 206 rotates about rotation axis 212. In another embodiment, the acceleration signal represents an acceleration on accelerometer 206 measured by a sensing axis 230 of accelerometer 206 aligned with radial axis 216 as accelerometer 206 rotates about rotation axis 212. In another embodiment, the acceleration signal represents a linear combination of an acceleration on accelerometer 206 measured by a sensing axis 228 of accelerometer 206 aligned with tangential axis 208 and by a sensing axis 230 of accelerometer 206 aligned with radial axis 216.

At step 504, one or more tilt adjustment signals for adjusting a tilt of the rotation head 202 to a leveled orientation are determined based on the acceleration signal. The tilt adjustment signals adjust the tilt of rotation head 202 in two dimensions to substantially eliminate a sinusoidal component in the acceleration signal. In one embodiment, a first tilt adjustment signal is generated for adjusting the tilt of the rotation head 202 in a first dimension (e.g., X dimension) and a second tilt adjustment signal is generated for adjusting the tilt of the rotation head 202 in a second dimension (e.g., Y dimension). In one embodiment, for example where laser transmitter 200 is equipped with an encoder, the tilt adjustment signals are determined as described with respect to FIG. 6. In another embodiment, for example where laser transmitter 200 is not equipped with an encoder, the tilt adjustment signals are determined as described with respect to FIG. 8. In one embodiment, where the acceleration signal represents (at least in part) acceleration measured by a sensing axis 230 on radial axis 216, in order to avoid clipping of the acceleration signal, the output range of accelerometer 206 is bigger than $a=4\pi^2 f^2 r$ or accelerometer 206 must be placed close enough to the center so the bias is within the range of accelerometer 206.

At step 506, the tilt of the rotation head 202 is adjusted based on the one or more tilt adjustment signals. In one embodiment, a first actuator adjusts the tilt of rotation head 202 in the first dimension based on the first tilt adjustment signal and a second actuator adjusts the tilt of rotation head 202 in a second dimension based on the second tilt adjustment signal to bring rotation head 202 to a leveled orientation.

Figure 6:
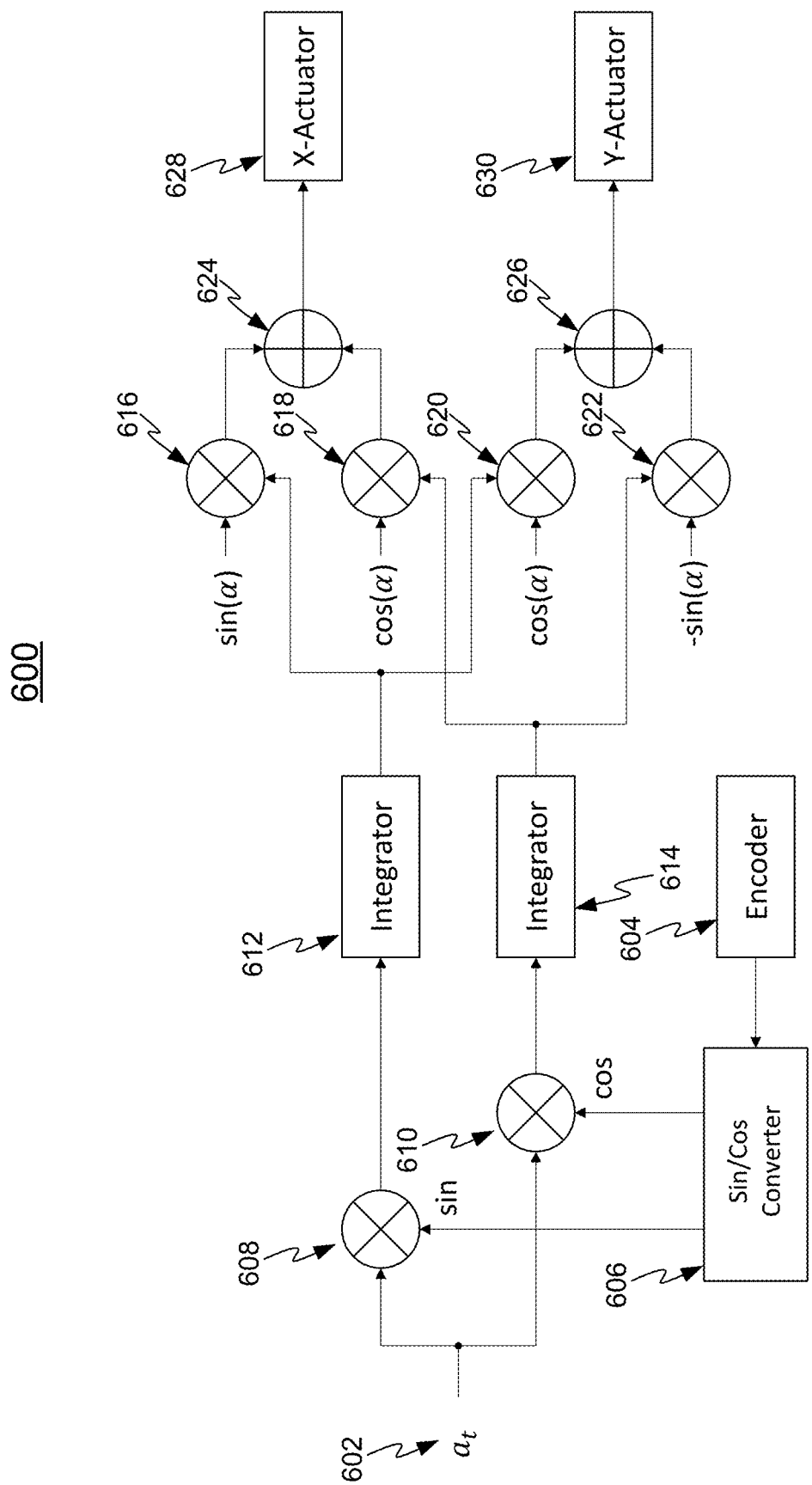
FIG. 6 shows a functional diagram for determining tilt adjustment signals for adjusting a tilt of a rotation head of a laser transmitter to a leveled orientation where the laser transmitter is equipped with a rotary encoder.

FIG. 6 shows a functional diagram 600 for determining tilt adjustment signals for adjusting a tilt of a rotation head of a laser transmitter to a leveled orientation, in accordance with one or more embodiments. Step 504 of FIG. 5 may be implemented according to functional diagram 600, e.g., where the laser transmitter is equipped with an encoder.

In functional diagram 600, an encoder 604 of a laser transmitter provides an angular position of the rotation head of the laser transmitter. Encoder 604 may be any suitable encoder, such as, e.g., an absolute or incremental rotary encoder. The angular position is converted to a sine and a cosine signals by sin/cos converter 606, e.g., using a sine look up table or by performing direct calculation of sin(x) and cos(x) functions, where x is the angular position in radians or degrees. Multipliers 608 and 610 multiply an acceleration $a_t$ 602 with the sine and the cosine respectively to perform a frequency shift. Tangential acceleration $a_t$ 602 is received from an accelerometer mounted on the rotation head and represents acceleration on the accelerator as the accelerator rotates. Results of multipliers 608 and 610 are accumulated by integrators 612 and 614 respectively over a period of time for an integer number of rotations of the rotation head. Then the output of integrators 612 and 614 (e.g., a 2D vector) is rotated to an angle of misalignment a by multiplying the output with a rotation matrix $$\begin{pmatrix} \cos\alpha & -\sin\alpha \\ \sin\alpha & \cos\alpha \end{pmatrix}$$

in following steps. The sin a cos a integrated results from integrator 612 are multiplied by sin(α) and cos(α) by multipliers 616 and 620 respectively and the integrated results from integrator 614 are multiplied by cos(α) and −sin(α) by multipliers 618 and 622 respectively, where a is the angle of misalignment between one or more actuators and the reference angle of encoder 604 of the laser transmitter. The angle α of misalignment is further described below with respect to FIG. 7. The results of multipliers 616 and 618 are combined by adder 624 to provide tilt adjustment signals for adjusting the tilt of the rotation head in an X dimension, which are output to an actuator 628. The results of multipliers 620 and 622 are combined by adder 626 to provide tilt adjustment signals for adjusting the tilt of the rotation head in a Y dimension, which are output to an actuator 630. The tilt adjustment signals eliminate any sinusoidal component on acceleration $a_t$ 602. Actuators 628 and 630 adjust the tilt of the rotation head in the X and Y dimension respectively according to the tilt adjustment signals to level the rotation head of the laser transmitter.

Figure 7:
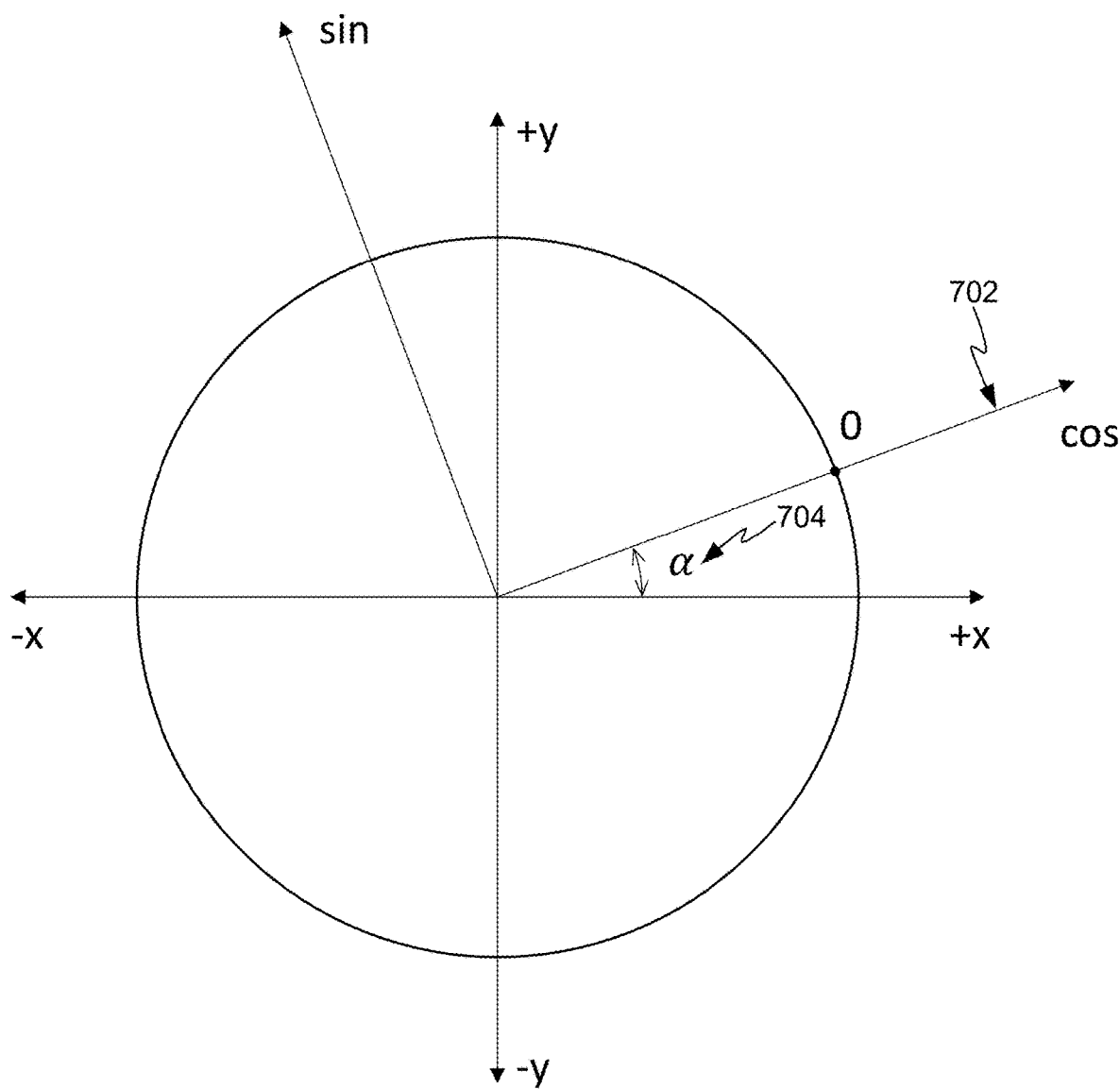
FIG. 7 shows an exemplary graph depicting an angle of misalignment between a reference angle of one or more actuators and a reference angle of an encoder.

FIG. 7 shows a graph 700 showing an angle of misalignment between a reference angle of one or more actuators adjusting a tilt of a rotation head of a laser transmitter and a reference angle of an encoder of the laser transmitter, in accordance with one or more embodiments. The reference angle (zero) of the encoder is represented by line 702 and corresponds to the cos line. The reference angle (zero) of the actuators is represented by the +x axis. The angle α 704 of misalignment is shown as the angle formed by the +x axis and line 702.

Figure 8:
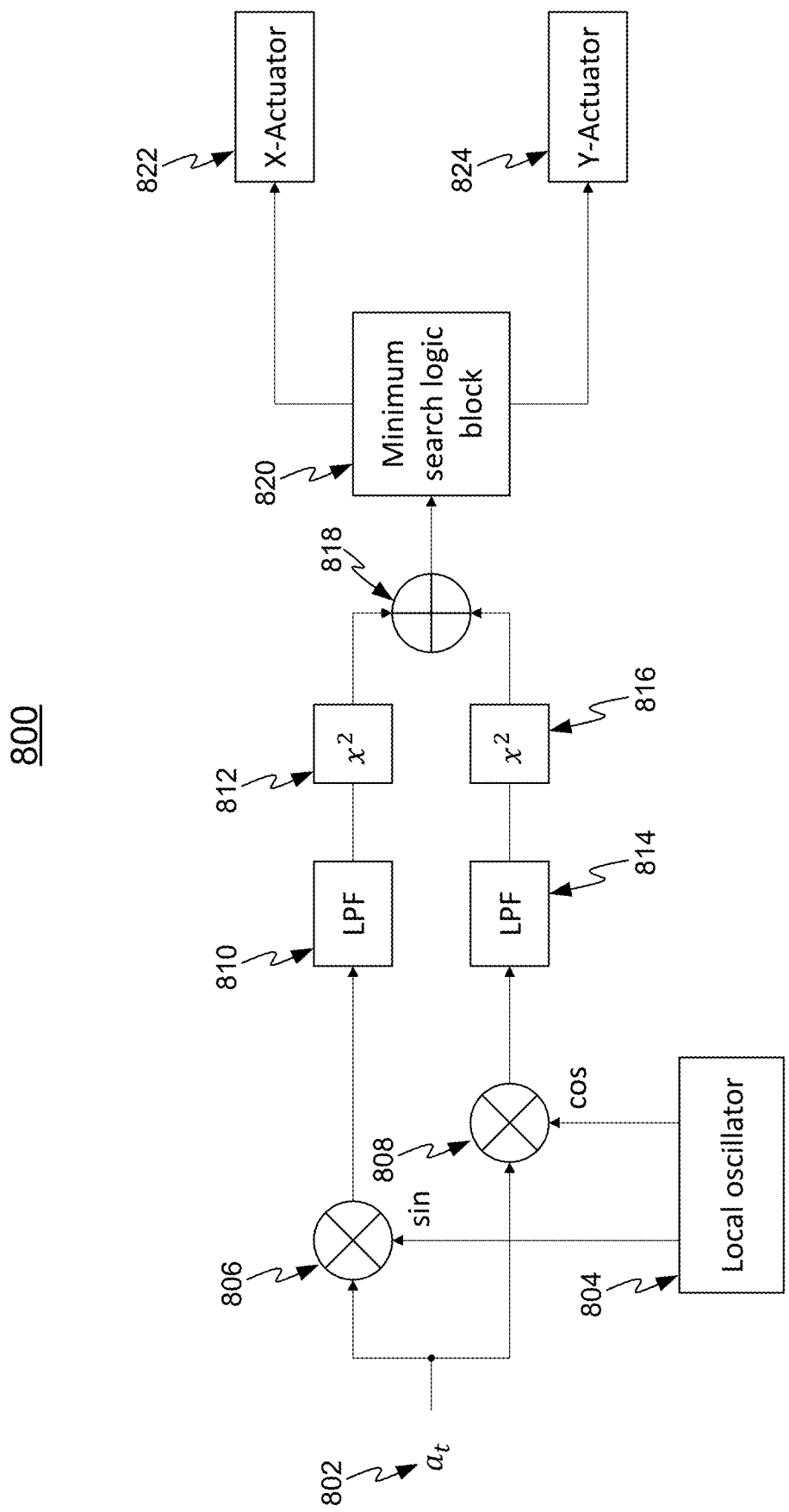
FIG. 8 shows a functional diagram for determining tilt adjustment signals for adjusting a tilt of a rotation head of a laser transmitter to a leveled orientation where the laser transmitter is not equipped with an encoder.

FIG. 8 shows a functional diagram 800 for determining tilt adjustment signals for adjusting a tilt of a rotation head of a laser transmitter to a leveled orientation, in accordance with one or more embodiments. Step 504 of FIG. 5 may be implemented according to functional diagram 800, e.g., where the laser transmitter is not equipped with an encoder.

Local oscillator 804 outputs sin and cos signals at an approximate rate of rotation, which are multiplied with an acceleration $a_t$ 802 (e.g., tangential or radial acceleration) by multipliers 806 and 808 respectively. Acceleration $a_t$ 802 is received from an accelerator mounted on the rotation head and represents acceleration on the accelerator as the accelerator rotates. The results of multipliers 806 and 808 are respectively processed by low pass filters 810 and 814 with a bandwidth larger than the difference between the actual rate of rotation and the approximate rate of rotation and squared functions 812 and 816, and are combined by adder 818. A minimum search logic block 820 determines tilt adjustment signals for adjusting the tilt of the rotation head in an X dimension and a Y dimension from results of adder 818, which are then output to actuators 822 and 824 to adjust the tilt of the rotation head in the X and Y dimension respectively to a leveled orientation by eliminating sinusoidal component on tangential acceleration $a_t$ 802. Minimum search logic block 820 determines tilt adjustment signals that substantially eliminate any sinusoidal component from tangential acceleration $a_t$ 802. In one embodiment, minimum search logic block 820 may implemented to apply an algorithm (e.g., minimum search algorithm) to minimize the amplitude of tangential acceleration $a_t$ 802. Exemplary minimum search algorithms include gradient descent algorithm or an eight point approximation algorithm, as described below with respect to FIGS. 9 and 10 respectively.

Figure 9:
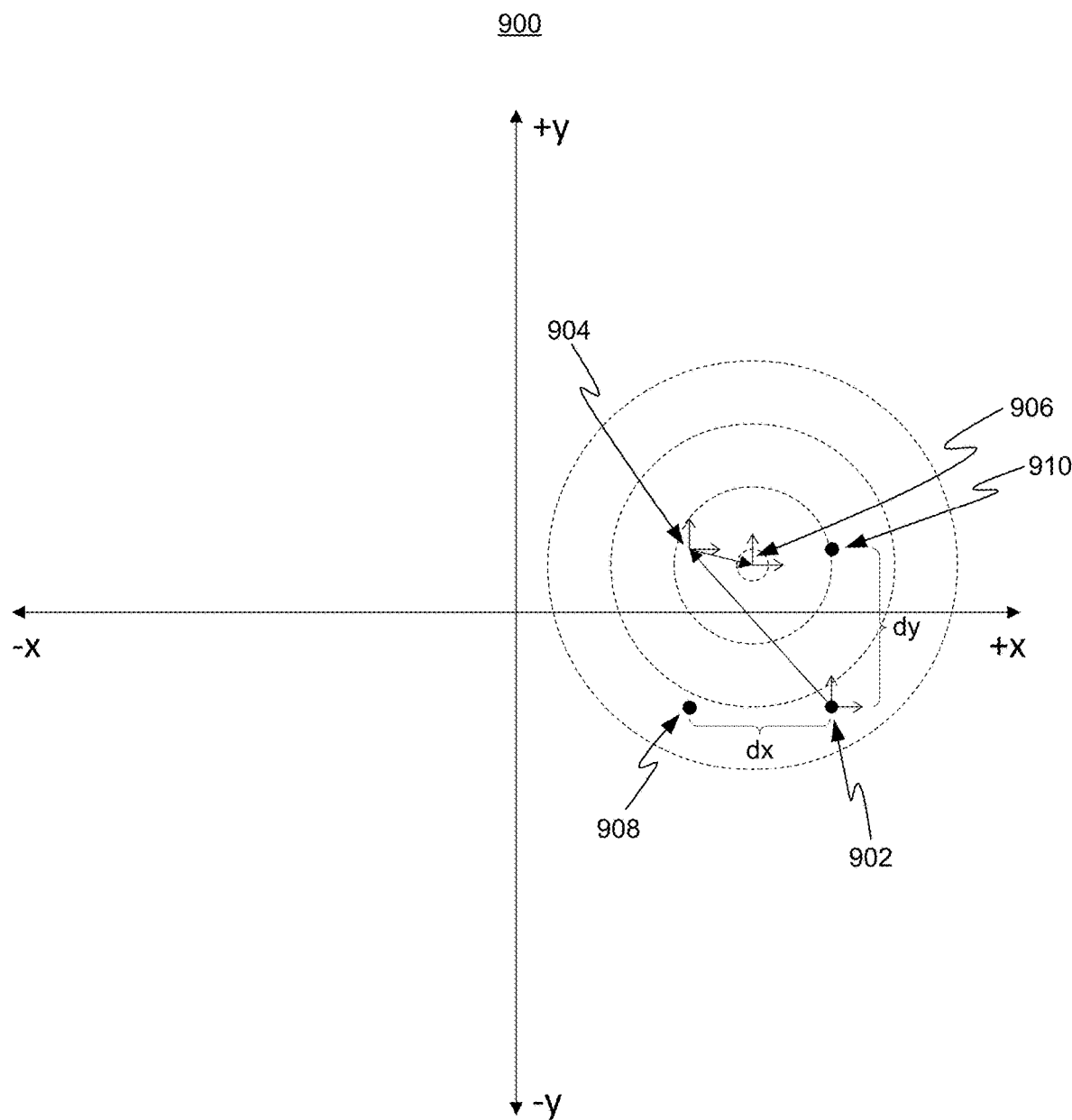
FIG. 9 shows a high-level diagram for determining tilt adjustment signals to level a rotation head of a laser transmitter using a gradient descent algorithm.

FIG. 9 shows a high-level diagram 900 for determining tilt adjustment signals to level a rotation head of a laser transmitter using a gradient descent algorithm, in accordance with one or more embodiments. The gradient descent algorithm determines tilt adjustment signals to provide a minimum amplitude for the acceleration signal (e.g., tangential or radial acceleration signal). Starting at an initial point (x, y) 902 (e.g., determined as the output of adder 818), the amplitude $a_0$ of the acceleration signal is measured for initial point (x, y) 902 and $a_{dx}$ for point (x+dx, y) 908 and $a_{dy}$ for point (x, y+dy) 910. Initial steps dx and dy can be selected arbitrarily or based on the total range of actuator adjustment, e.g. 10% or 5% of total range. The gradient is calculated $$\nabla = \left\{ \frac{a_0 - a_{dx}}{dx}, \frac{a_0 - a_{dy}}{dy} \right\}$$

and the initial point (x, y) 902 is moved in the direction of the gradient to point 904. The process repeated to identify the minimum amplitude for the tangential acceleration at point 906.

Figure 10:
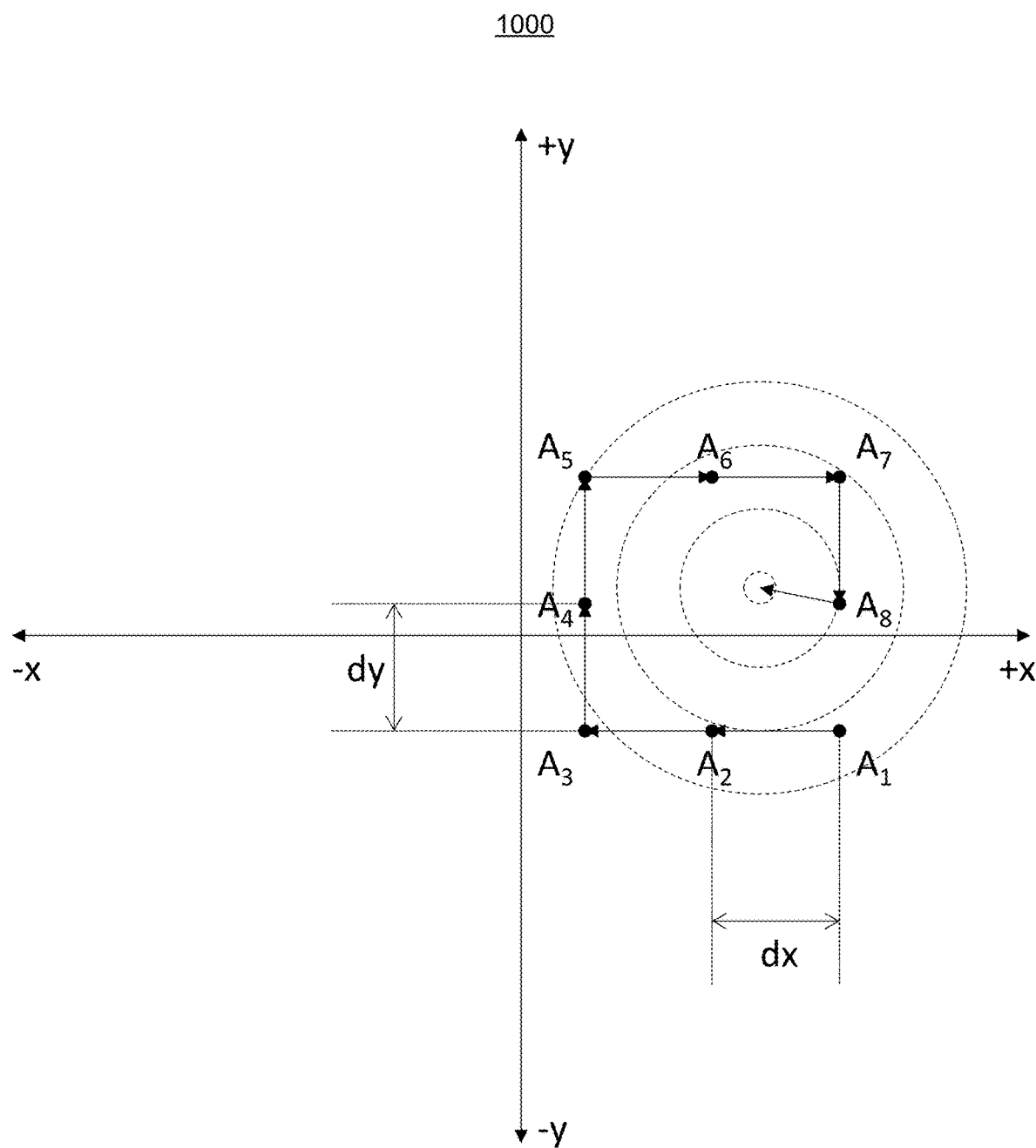
FIG. 10 shows a high-level diagram for determining tilt adjustment signals to level a rotation head of a laser transmitter using an eight point approximation algorithm.

FIG. 10 shows a high-level diagram 1000 for determining tilt adjustment signals to level a rotation head of a laser transmitter using an eight point approximation algorithm, in accordance with one or more embodiments. The eight point approximation algorithm determines tilt adjustment signals to provide a minimum amplitude for the tangential acceleration. Starting from an initial point (x, y) (e.g., determined as the output of adder 818), an arbitrary dx and dy (dx may equal dy) is determined (e.g., as 5% of the total actuator range). The amplitude of the tangential acceleration is measured for eight points: $A_1$(x+dx, y−dy), $A_2$(x, y−dy), $A_3$(x−dx, y−dy), $A_4$(x−dx, y), $A_5$(x−dx, y+dy), $A_6$(x, y+dy), $A_7$(x+dx, y+dy), and $A_8$(x+dx, y). Coefficient k is calculated as k=$A_1$+$A_3$+$A_5$+$A_7$−$A_2$−$A_4$−$A_6$−$A_8$. Δx and Δy are calculated as $$\Delta x = \frac{A_3 + A_4 + A_5 - A_1 - A_7 - A_8}{3k} \text{ and}$$

$$\Delta y = \frac{A_1 + A_2 + A_3 - A_5 - A_6 - A_7}{3K}.$$

The tilt adjustment signals are determined as (x+Δx) and (y+Δy), which correspond to the leveled orientation of the rotation head of the laser transmitter.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 11:
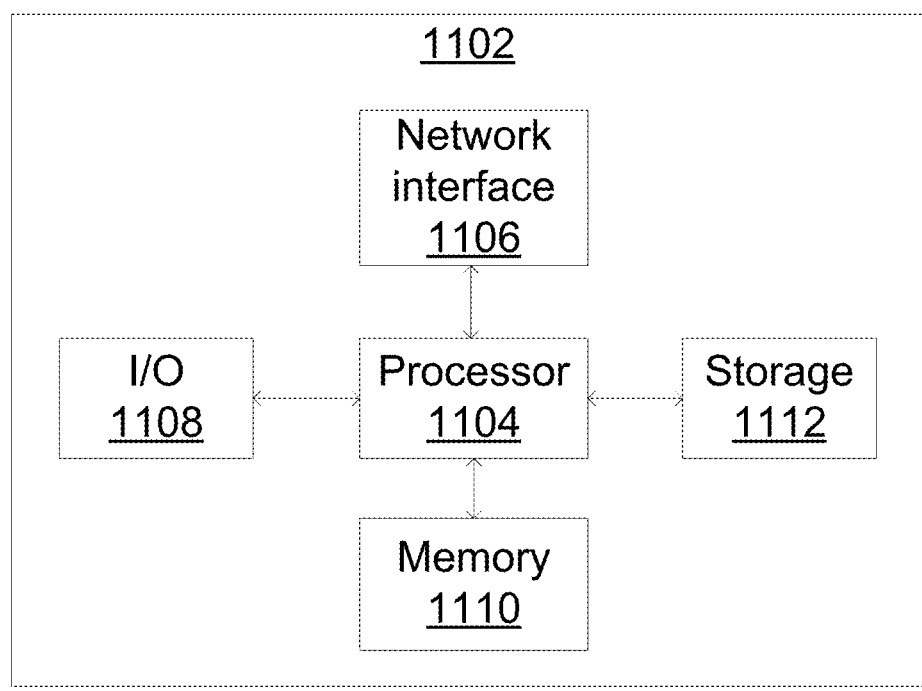
FIG. 11 shows a high-level block diagram of a computer for implementing aspects of the present invention.

A high-level block diagram of an example computer 1102 that may be used to implement systems, apparatus, and methods described herein is depicted in FIG. 11. Computer 1102 includes a processor 1104 operatively coupled to a data storage device 1112 and a memory 1110. Processor 1104 controls the overall operation of computer 1102 by executing computer program instructions that define such operations. The computer program instructions may be stored in data storage device 1112, or other computer readable medium, and loaded into memory 1110 when execution of the computer program instructions is desired. Thus, the method and workflow steps or functions of FIG. 5 can be defined by the computer program instructions stored in memory 1110 and/or data storage device 1112 and controlled by processor 1104 executing the computer program instructions. For example, the computer program instructions can be implemented as computer executable code programmed by one skilled in the art to perform the method and workflow steps or functions of FIG. 5. Accordingly, by executing the computer program instructions, the processor 1104 executes the method and workflow steps or functions of FIG. 5. Computer 1104 may also include one or more network interfaces 1106 for communicating with other devices via a network. Computer 1102 may also include one or more input/output devices 1108 that enable user interaction with computer 1102 (e.g., display, keyboard, mouse, speakers, buttons, etc.).

Processor 1104 may include both general and special purpose microprocessors, and may be the sole processor or one of multiple processors of computer 1102. Processor 1104 may include one or more central processing units (CPUs), for example. Processor 1104, data storage device 1112, and/or memory 1110 may include, be supplemented by, or incorporated in, one or more application-specific integrated circuits (ASICs) and/or one or more field programmable gate arrays (FPGAs).

Data storage device 1112 and memory 1110 each include a tangible non-transitory computer readable storage medium. Data storage device 1112, and memory 1110, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1108 may include peripherals, such as a printer, scanner, display screen, etc. For example, input/output devices 1108 may include a display device such as a cathode ray tube (CRT) or liquid crystal display (LCD) monitor for displaying information to the user, a keyboard, and a pointing device such as a mouse or a trackball by which the user can provide input to computer 1102.

Any or all of the systems and apparatus discussed herein, including elements of data processor 226 of FIG. 2, may be implemented using one or more computers such as computer 1102.

One skilled in the art will recognize that an implementation of an actual computer or computer system may have other structures and may contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A laser transmitter comprising:
  a rotation head;
  an accelerometer mounted on the rotation head;
  a processor;
  a memory to store computer program instructions, the computer program instructions when executed on the processor cause the processor to perform operations comprising:
    receiving an acceleration signal from the accelerometer, and
    generating one or more tilt adjustment signals for adjusting a tilt of the rotation head to a leveled orientation based on the acceleration signal; and
  one or more actuators for adjusting the tilt of the rotation head based on the one or more tilt adjustment signals.

2. The laser transmitter of claim 1, wherein the acceleration signal represents at least one of acceleration on a tangential axis of the accelerometer and acceleration on a radial axis of the accelerometer as the accelerometer rotates.

3. The laser transmitter of claim 1, wherein generating one or more tilt adjustment signals for adjusting a tilt of the rotation head to a leveled orientation based on the acceleration signal comprises:
  generating the one or more tilt adjustment signals to substantially eliminate a sinusoidal component from the acceleration signal.

4. The laser transmitter of claim 3, wherein generating the one or more tilt adjustment signals to substantially eliminate a sinusoidal component from the acceleration signal comprises:
  generating the one or more tilt adjustment signals based on an angle of misalignment between a reference angle of an encoder of the laser transmitter and a reference angle of the one or more actuators.

5. The laser transmitter of claim 3, wherein generating the one or more tilt adjustment signals to substantially eliminate a sinusoidal component from the acceleration signal comprises:
  generating the one or more tilt adjustment signals to minimize an amplitude of the acceleration signal.

6. The laser transmitter of claim 1, wherein:
  generating one or more tilt adjustment signals for adjusting a tilt of the rotation head to a leveled orientation based on the acceleration signal comprises:
    generating a first tilt adjustment signal for adjusting a tilt of the rotation head in a first dimension and a second tilt adjustment signal for adjusting a tilt of the rotation head in a second dimension, and
  the one or more actuators comprises a first actuator for adjusting the tilt of the rotation head in the first dimension based on the first tilt adjustment signal and a second actuator for adjusting the tilt of the rotation head in the second dimension based on the second tilt adjustment signal.

7. A method comprising:
  receiving an acceleration signal from an accelerometer mounted on a rotation head of a laser transmitter;
  generating one or more tilt adjustment signals for adjusting a tilt of the rotation head to a leveled orientation based on the acceleration signal; and
  adjusting the tilt of the rotation head based on the one or more tilt adjustment signals.

8. The method of claim 7, wherein the acceleration signal represents at least one of acceleration on a tangential axis of the accelerometer and acceleration of a radial axis of the accelerometer as the accelerometer rotates.

9. The method of claim 7, wherein generating one or more tilt adjustment signals for adjusting a tilt of the rotation head to a leveled orientation based on the acceleration signal comprises:
  generating the one or more tilt adjustment signals to substantially eliminate a sinusoidal component from the acceleration signal.

10. The method of claim 9, wherein generating the one or more tilt adjustment signals to substantially eliminate a sinusoidal component from the acceleration signal comprises:
  generating the one or more tilt adjustment signals based on an angle of misalignment between a reference angle of an encoder of the laser transmitter and a reference angle of one or more actuators.

11. The method of claim 9, wherein generating the one or more tilt adjustment signals to substantially eliminate a sinusoidal component from the acceleration signal comprises:
  generating the one or more tilt adjustment signals to minimize an amplitude of the acceleration signal.

12. The method of claim 7, wherein:
  generating one or more tilt adjustment signals for adjusting a tilt of the rotation head to a leveled orientation based on the acceleration signal comprises:
    generating a first tilt adjustment signal for adjusting a tilt of the rotation head in a first dimension and a second tilt adjustment signal for adjusting a tilt of the rotation head in a second dimension, and
  adjusting the tilt of the rotation head based on the one or more tilt adjustment signals comprises:
    adjusting the tilt of the rotation head in the first dimension based on the first tilt adjustment signal, and
    adjusting the tilt of the rotation head in the second dimension based on the second tilt adjustment signal.

13. A laser transmitter comprising:
  means for receiving an acceleration signal;
  means for generating one or more tilt adjustment signals for adjusting a tilt of a rotation head of the laser transmitter to a leveled orientation based on the acceleration signal; and
  means for adjusting the tilt of the rotation head based on the one or more tilt adjustment signals.

14. The laser transmitter of claim 13, wherein the acceleration signal represents at least one of acceleration on a tangential axis of an accelerometer and acceleration on a radial axis of the accelerometer as the accelerometer rotates.

15. The laser transmitter of claim 13, wherein the means for generating one or more tilt adjustment signals for adjusting a tilt of the rotation head to a leveled orientation based on the acceleration signal comprises:

means for generating the one or more tilt adjustment signals to substantially eliminate a sinusoidal component from the acceleration signal.

16. The laser transmitter of claim 15, wherein the means for generating the one or more tilt adjustment signals to substantially eliminate a sinusoidal component from the acceleration signal comprises:
   means for generating the one or more tilt adjustment signals based on an angle of misalignment between a reference angle of an encoder of the laser transmitter and a reference angle of one or more actuators.

17. The laser transmitter of claim 15, wherein the means for generating the one or more tilt adjustment signals to substantially eliminate a sinusoidal component from the acceleration signal comprises:
   means for generating the one or more tilt adjustment signals to minimize an amplitude of the acceleration signal.

18. The laser transmitter of claim 13, wherein:
   the means for generating one or more tilt adjustment signals for adjusting a tilt of the rotation head to a leveled orientation based on the acceleration signal comprises:
      means for generating a first tilt adjustment signal for adjusting a tilt of the rotation head in a first dimension and a second tilt adjustment signal for adjusting a tilt of the rotation head in a second dimension, and
   the means for adjusting the tilt of the rotation head based on the one or more tilt adjustment signals comprises:
      means for adjusting the tilt of the rotation head in the first dimension based on the first tilt adjustment signal, and
      means for adjusting the tilt of the rotation head in the second dimension based on the second tilt adjustment signal.

19. A self-leveling apparatus, comprising:
   a rotation head;
   an accelerometer mounted on the rotation head;
   a processor;
   a memory to store computer program instructions, the computer program instructions when executed on the processor cause the processor to perform operations comprising:
      receiving an acceleration signal from the accelerometer, and
      generating one or more tilt adjustment signals for adjusting a tilt of the rotation head to a leveled orientation based on the acceleration signal; and
   one or more actuators for adjusting the tilt of the rotation head based on the one or more tilt adjustment signals.

20. The self-leveling apparatus of claim 19, wherein the acceleration signal represents at least one of acceleration on a tangential axis of the accelerometer and acceleration on a radial axis of the accelerometer as the accelerometer rotates.

* * * * *